UNITED STATES PATENT OFFICE.

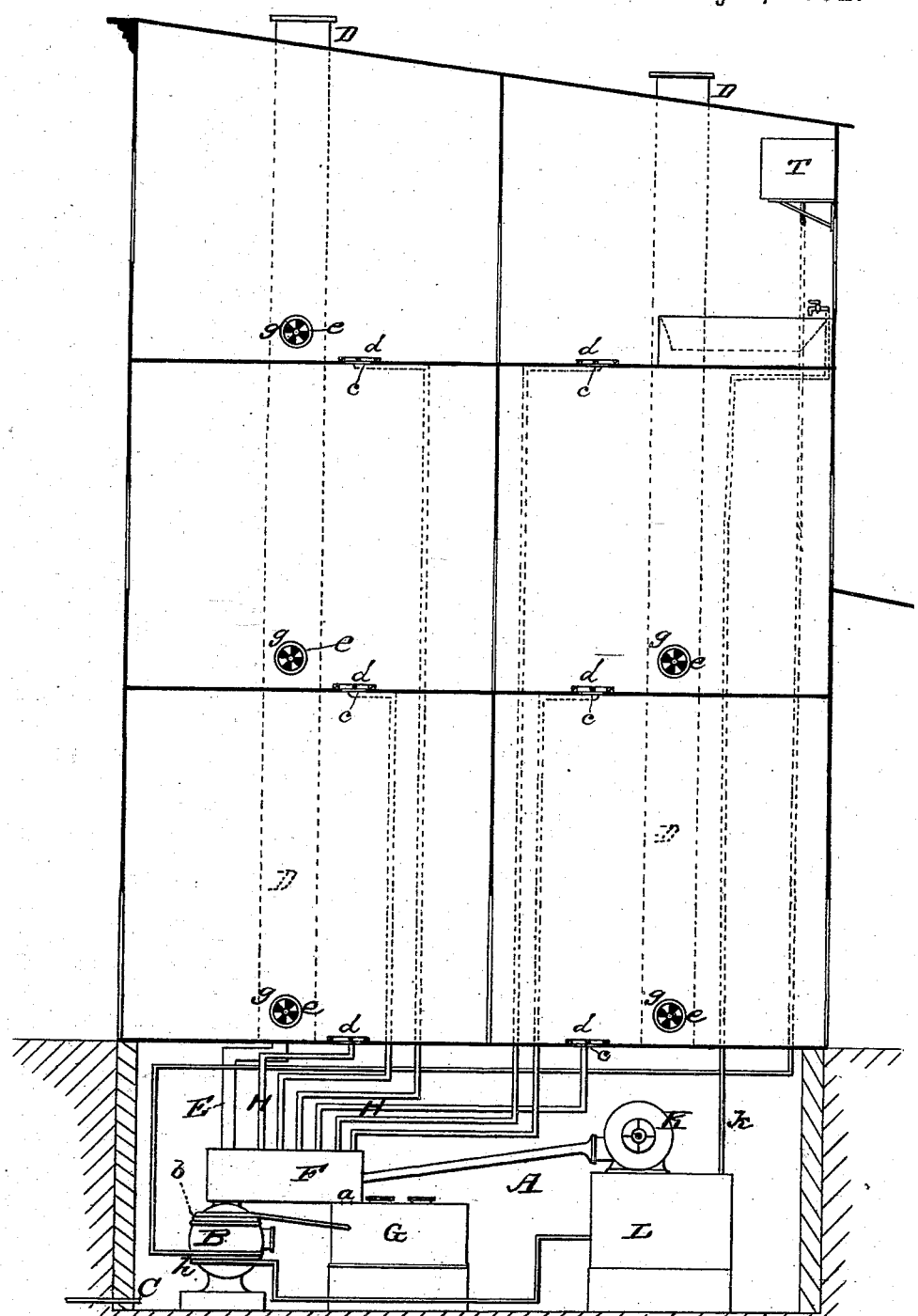

ALVIA K. BROWN, OF NEWTON, IOWA.

APPARATUS FOR HEATING AIR AND WATER FOR BUILDINGS.

SPECIFICATION forming part of Letters Patent No. 257,650, dated May 9, 1882.

Application filed March 11, 1882. (No model.)

*To all whom it may concern:*

Be it known that I, ALVIA K. BROWN, a citizen of the United States, and resident of Newton, in the county of Jasper and State of Iowa, have invented a new and valuable Improvement in Apparatus for Heating Air and Water for Buildings, &c.; and I do hereby declare that the following is a full, clear, and exact description of the construction and operation of the same, reference being had to the annexed drawing, making a part of this specification, and to the letters and figures of reference marked thereon.

The drawing is a representation of a vertical sectional view of a building, showing my improvement.

This invention has relation to devices for removing cold air from apartments or buildings and replacing the same with fresh warm air, tempered with the vapor of water; and it consists in the novel construction and arrangement of parts, as will be hereinafter fully described, and particularly pointed out in the claims.

In the accompanying drawing, the letter A designates the furnace-chamber in the lower part of the house, and B the furnace therein.

C represents the cold-air flue leading into the base of the furnace-chamber, which is otherwise designed to be air-tight.

D indicates chimneys, and E the smoke-pipe of the furnace, passing through a drum, F, over said furnace and over the outlet $a$ of the water-chamber G, which is heated by a coil of pipe, $b$, extending around the upper portion of the stove or furnace B. From the drum F the hot-air pipes H extend to the apartments to be heated, said pipes terminating in openings $c$ in said apartments, which are provided with registers $d$. In these apartments the chimneys D are also provided with exit-openings $e$ near the floor, through which the cold air falling to the floor escapes as the hot air is forced into the room. The openings $e$ in the chimneys are provided with registers $g$, whereby the escape of the cold air through the openings can be regulated.

In the air-tight furnace-chamber a fan, K, is located, the spout of said fan communicating with the drum F and through it with the hot-air pipes which lead therefrom. The fan may be run by hand or by steam power or a spring-motor may be used. The object of the fan is to keep the warm air in motion and to force the current through the pipes, some of which may extend in the horizontal direction.

In connection with the furnace B a second coil of heating-pipe is arranged around its lower portion, as indicated at $h$, said pipe communicating with a hot-water tank, L, in the furnace-chamber, from which a distributing-pipe, $k$, extends to the bath-room or other part of the house where hot water may be required. At a convenient point in the upper portion of the house is situated a supply-tank, T, from which water passes downward through the coil-pipe $h$, around the furnace, to the distributing-tank, as indicated in the drawing.

Having described this invention, what I claim, and desire to secure by Letters Patent, is—

1. The air and water heating apparatus for buildings and apartments, consisting of the air-tight furnace-chamber A, furnace B, drum F, water-chamber G, fan K, water-tanks L T, and coiled heating-pipes $b$ $h$, substantially as specified.

2. The air-heating and ventilating apparatus for buildings and apartments, consisting of the air-tight furnace-chamber A, furnace B, water-chamber G, coiled heating-pipe $b$, drum F, fan K, cold-air flue C, hot-air pipes H, and cold-air outlets $e$ in chimneys D, substantially as specified.

In testimony that I claim the above I have hereunto subscribed my name in the presence of two witnesses.

A. K. BROWN.

Witnesses:
　C. SEEBERGER,
　C. W. STAHL.